United States Patent [19]

Kimura et al.

[11] Patent Number: 4,650,293
[45] Date of Patent: Mar. 17, 1987

[54] ALBADA FINDER OPTICAL SYSTEM OF INVERTED GALILEAN TYPE

[75] Inventors: Kazuo Kimura; Taro Shibuya, both of Sakai, Japan

[73] Assignee: Minolta Camera Kabushiki Kaisha, Osaka, Japan

[21] Appl. No.: 786,659

[22] Filed: Oct. 11, 1985

[30] Foreign Application Priority Data

Oct. 11, 1984 [JP] Japan .................. 59-123791

[51] Int. Cl.⁴ ................... G02B 9/04; G02B 17/00; G02B 25/00
[52] U.S. Cl. ................... 350/453; 350/432; 350/444
[58] Field of Search ............. 350/432, 443, 444, 479, 350/453

[56] References Cited

U.S. PATENT DOCUMENTS 3,182,545  5/1965  Papke .................. 350/444

FOREIGN PATENT DOCUMENTS 50-27539  3/1975  Japan .
0046730  4/1980  Japan .................. 350/444
0093116  7/1980  Japan .................. 350/432
59-33419  2/1984  Japan .
59-23330  2/1984  Japan .

Primary Examiner—John K. Corbin
Assistant Examiner—Rebecca D. Gass
Attorney, Agent, or Firm—Price, Gess & Ubell

[57] ABSTRACT

An albada finder optical system of inverted Galilean type, comprising from the object side to the eye side: an objective lens component of a negative refractive power; and an eyepiece lens component of a positive refractive power having a reflecting surface at the object side.

6 Claims, 16 Drawing Figures

ASTIGMATISM

DISTORTION

DISTORTION

ALBADA FINDER OPTICAL SYSTEM OF INVERTED GALILEAN TYPE

BACKGROUND OF THE INVENTION

1. Field of the Invention

The present invention relates to a finder optical system of a camera, and more particularly to an Albada finder optical system of inverted Galilean type which comprises, from the object side, a front lens group of a negative refractive power and a rear lens group of a positive refractive power, and which is capable of indicating marks, such as a frame a distance indicator and so on, in a finder field.

2. Description of the Prior Art

The above type finder optical systems are known which comprises a front lens group consisting of two negative lens components and a rear lens group consisting of one positive lens component, by Japanese Laid-Open Patent Application Nos. 50-27539, 59-33419, 59-23330 and so on. Such construction is shown in FIG. 1. In FIG. 1, a virtual image of an object is formed by a first negative lens component ($L_{o1}$) and a second negative lens component ($L_{o2}$), and the virtual image is magnified by a third positive lens component ($L_e$) for finder observation. A frame mark (M) for indicating a frame in finder field is formed on a glass plate (P) located between the second and third lens components ($L_{o2}$)($L_e$). The eye side surface of the second lens component ($L_{o2}$) is a reflecting surface for reflecting the light from the mark (M) towards the eye. Thus, an image of the mark (M) is indicated in the finder field. In this construction, the distortion is controlled by dividing a negative refractive power into two lens components.

On the other hand, an inverted Galilean type finder optical system having no indication by Albada type optical system is shown in FIG. 2. In FIG. 2, the inverted Galilean type finder optical system comprises, from the object side, an objective lens group consisting of a negative objective lens component, and an eyepiece lens group consisting of a positive eyepiece lens component.

Here, it is clear that the Albada finder lens system of inverted Galilean type shown in FIG. 1 is more complex in construction than the inverted Galilean finder lens system shown in FIG. 2 is. Therefore, the Albada finder lens system is complex in manufacturing and in adjustment of each elements, and causes to require more cost.

SUMMARY OF THE INVENTION

A main object of the present invention is to provide an Albada finder optical system of inverted Galilean type which is simple in construction and which is capable of indicating at least a mark, such as a frame, a distance indicator and so on in the finder field.

The above and other objects, features and advantages of the present invention will become apparent from the following detailed description taken in conjunction with the accompanying drawings.

To achieve the above object, the present invention provides an Albada finder optical system of inverted Galilean type, comprising from the object side to the eye side; an objective lens component of a negative refractive power; and an eyepiece lens component of a positive refractive power having a reflecting surface at the object side; wherein the optical system fulfills the following conditions;

$0.35 < \Gamma < 0.8$
$0.1 < d_2/d_3 < 0.8$
$0.5 < d_3/L < 0.9$ wherein, $\Gamma$ represents the magnification of the finder optical system, $d_2$ represents the axial distance between the eye side surface of the objective lens component and the object side surface of the eyepiece lens component, $d_3$ represents the axial thickness of the eyepiece lens component, and L represents the total length of the whole optical system.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

Figure 1:
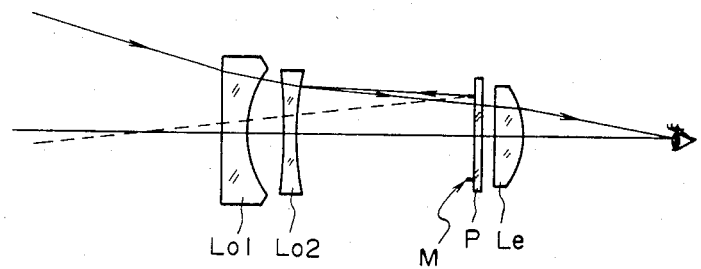
FIG. 1 represents a schematic view of conventional Albada finder optical systems of inverted Galilean type.
Figure 2:
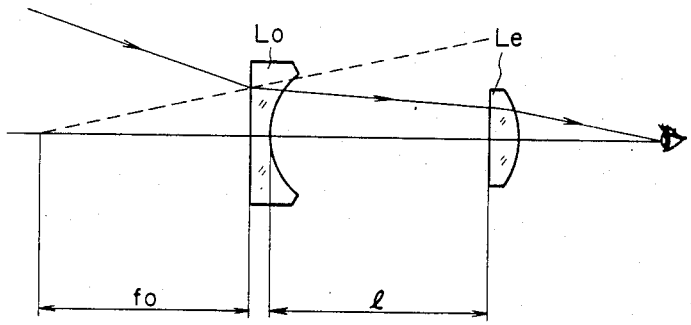
FIG. 2 represents a schematic view of conventional inverted Galilean type finder optical system.

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost finder optical system for utilization with a 35 mm lens-shutter camera.

In the drawings, schematic cross sectional views disclose the position of the lens components. Due to the number of lens components involved, it was not deemed appropriate to include individual designation of the radii of curvature and axial distances for each lens component and air space. These values, however, are provided in the accompanying tables set forth herein, and the schematic cross sectional views of the respective embodiments follow the normal conventions of an object at the left-hand side of the drawing and an eye at the right-hand side.

Figure 3:
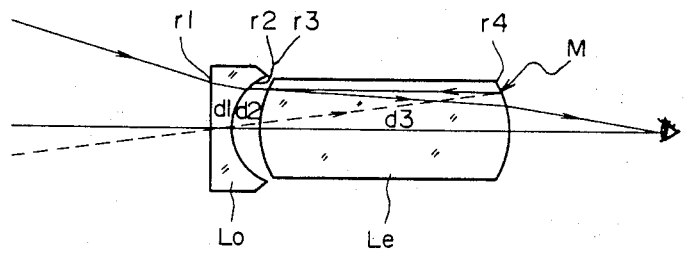
FIG. 3 represents a representative schematic view of the Albada finder optical system of inverted Galilean type according to first to third embodiments of the present invention.
Figure 4:
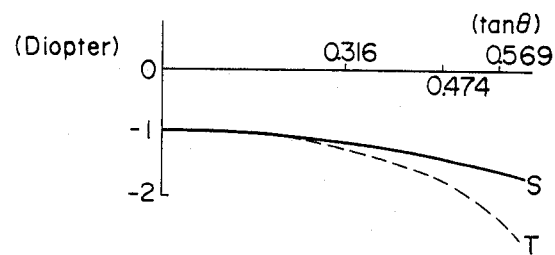
FIGS. 4(a) and 4(b) represent astigmatism and distortion of an object image in the first embodiment.
FIG. 4(c) represent astigmatism of a frame image in the first embodiment.
Figure 4:
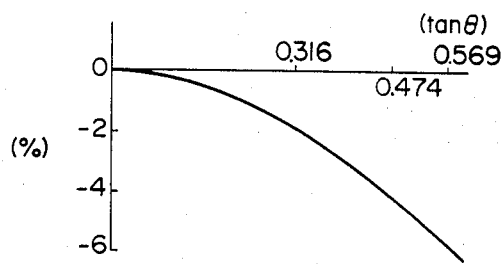
Figure 4:
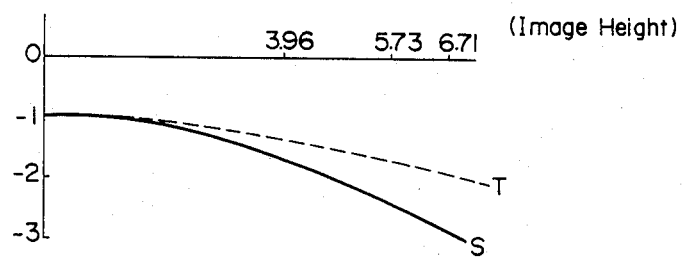
Figure 5A:
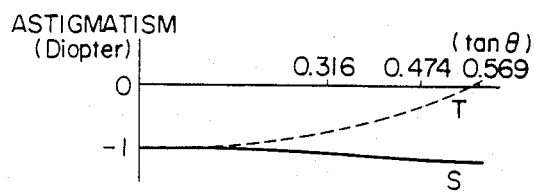
FIGS. 5(a) and 5(b) represent astigmatism and distortion of an object image in the second embodiment.
Figure 5B:
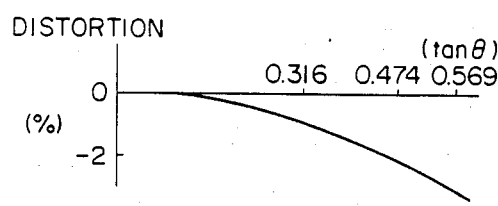
Figure 5C:
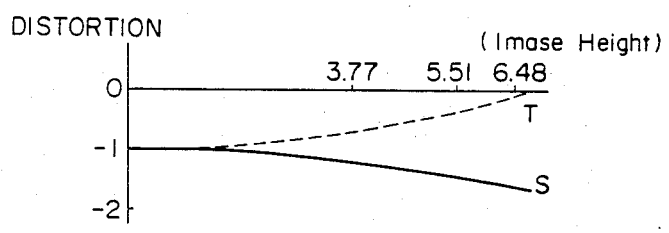
FIG. 5(c) represents astigmatism of a frame image in the second embodiment.
Figure 6A:
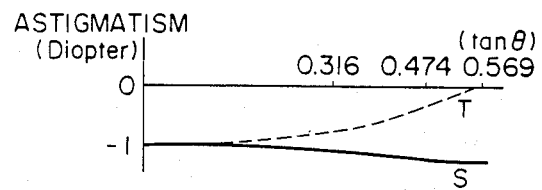
FIGS. 6(a) and 6(b) represent astigmatism and distortion of an object image in the third embodiment.
Figure 6B:
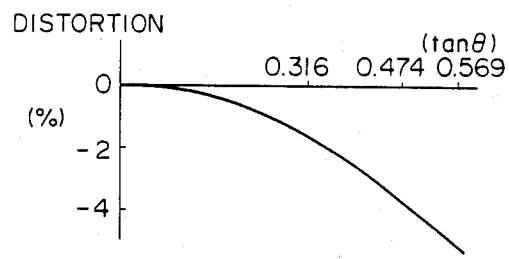
Figure 6C:
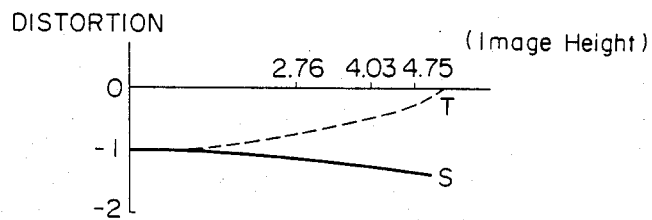
FIG. 6(c) represents astigmatism of a frame image in the third embodiment.
Figure 7A:
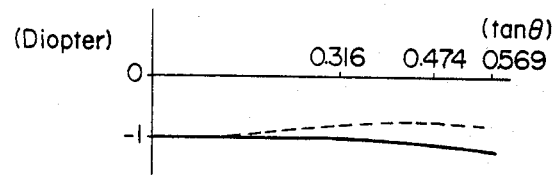
FIGS. 7(a) and 7(b) represent astigmatism and distortion of an object image in the fourth embodiment.
Figure 7B:
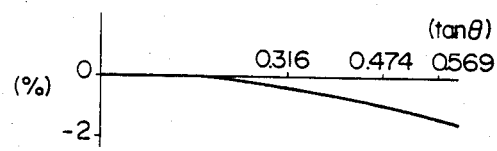
Figure 7C:
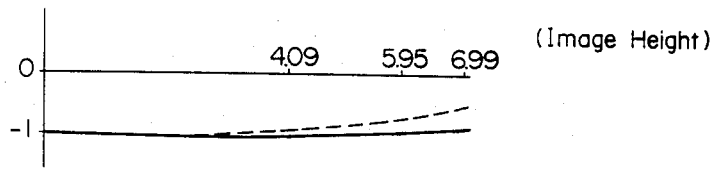
FIG. 7(c) represents astigmatism of a frame image in the fourth embodiment.
Figure 8:
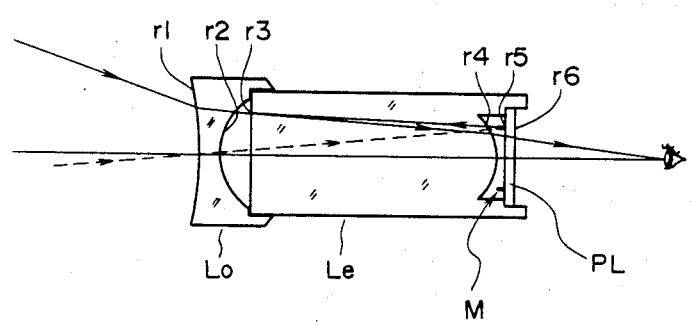
FIG. 8 represents a schematic view according to the fourth embodiment of the present invention.

As shown in FIGS. 3 and 8, the present invention provides an Albada finder optical system of inverted Galilean type, comprising from the object side to the eye side; an objective lens component (Lo) of a negative refractive power; and an eyepiece lens component (Le) of a positive refractive power having a reflecting surface at the object side; wherein the optical system fulfills the following conditions;

(I) $0.35 < \Gamma < 0.8$
(II) $0.1 < d_2/d_3 < 0.8$
(III) $0.5 < d_3/L < 0.9$ wherein, $\Gamma$ represents the magnification of the finder optical system, $d_2$ represents the axial distance between the eye side surface of the objective lens component (Lo) and the object side surface of the eyepiece lens component (Le), $d_3$ represents the axial thickness of the eyepiece lens component (Le), and L represents the total length of the whole optical system.

In the construction shown in FIG. 3, fo represents the focal length of the objective lens component (Lo); fe represents the focal length of the eyepiece lens component (Lo); l represents the axial distance between the two lens components (Lo) and (Le), and $r_1$ to $r_4$ represent the radii of curvature of the surfaces ($r_1$) to ($r_4$). At first, the investigation for applying a reflecting surface for Albada finder to the eye side surface ($r_2$) of the objective lens component (Lo) is considered. The finder magnification $\Gamma$ is defined as follows:

$$\Gamma \approx -fo/fe \quad (1)$$

On the other hand, the condition for setting the finder diopter to $-1$ is described as follows:

$$fe \approx -fo + l \quad (2)$$

If the finder magnification is determined to 0.5 which is normally utilized, $$fe \approx -2fo + l \quad (3)$$

is obtained by the equations (1) and (2).

Here, if the mark (M) to be indicated in the finder field is provided on the object side surface ($r_3$) of the eyepiece lens component (Le), the finder diopter of an object image and that of the mark image should be coincided with each other. Then, the condition for setting the finder diopter of the mark to $-1$ is described as follows:

$$1/l - 1/(fe-l) \approx 2/r_2 \quad (4)$$

Then the equation (3) is substituted for the equation (4)

$$1/l - 1/l \approx 2/r_2$$

$$\therefore r_2 \approx \infty$$

is obtained. Namely, if the reflecting surface for Albada finder is applied to the eye side surface ($r_2$) of the objective lens component (Lo), the refractive power of the surface ($r_2$) should be almost zero. Thus, almost all of the negative refractive power required for the objective lens component (Lo) is given to its object side surface ($r_1$). Then, since the refractive power of the object side surface ($r_1$) becomes too strong, the distortion is increased undesirably. Therefore, it is difficult to apply the reflecting surface for Albada finder to the eye side surface ($r_2$) of the objective lens component (Lo).

Here, if the finder magnification $\Gamma$ is determined to be less than 0.5, the radius of curvature of the surface ($r_2$) becomes negative. Thus, the refractive power of the surface ($r_2$) becomes positive. Therefore, the refractive power of the object side surface ($r_1$) should be more increased, and the distance is more increased. Contrary, if the finder magnification $\Gamma$ is determined over 0.5, the refractive power of the objective lens component (Lo) is decreased, and therefore the good correction of aberrations would be possible.

Therefore, the reflecting surface for Albada finder is applied to the object side surface ($r_3$) of the eyepiece lens component (Le), and the thickness of the eyepiece lens component (Le) is increased for obtaining a practical finder magnification without deterioration of the distortion, according to the present invention.

Condition (I) defines the range of the finder magnification $\Gamma$. If the lower limit of condition (I) is violated, the good correction of the distortion becomes difficult. If the upper limit of condition (I) is violated, the compactness of the finder optical system is deteriorated since the diameter of the objective lens component (Lo) is increased.

Condition (II) limits the ratio of the axial distance between the objective lens component (Lo) and the eyepiece lens component (Le) to the axial thickness of the eyepiece lens component (Lo). If the lower limit of condition (2) is violated, since the curvature of the surface ($r_2$) becomes close to that of the surface ($r_3$), the negative refractive power required for the object side surface ($r_1$) of the objective lens component (Lo) is too strong to well correct the distortion. If the upper limit of condition (II) is violated, the axial thickness of the eyepiece lens component (Le) becomes too thick, and therefore, the refractive power of the surface ($r_3$) should be increased for satisfying the required finder diopter of the mark image. It causes to deteriorate the distortion.

Condition (III) shows that the eyepiece lens component (Le) is very thick. If the lower limit of condition (III) is violated, it is difficult to correct the distortion well, in the same case when the upper limit of condition (II) is violated. If the upper limit of condition (III) is violated, it is impossible to give a negative refractive power to the objective lens component (Lo), and thus the inverted Galilean type optical system can not be constructed.

The following Tables 1 to 4 disclose, respectively, the first through fourth embodiments of the present invention. In the tables, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to eye side, and finally, $\nu$ equals the Abbe number and the sub numbers refer to the specific lens elements from the object eye side. The asterisk (*) represents the aspheric surface, and its coefficients are shown at the bottom of respective Tables.

Here, the aspheric coefficients $C_1, C_2 \ldots$ are defined by the following equation:

$$X = \frac{C_0 Y^2}{1 + \sqrt{1 - \epsilon C_0^2 Y^2}} + \Sigma C_i Y^{2i}$$

wherein Co represents the paraxial radius of curvature of the basic spheric surface, X represents the coordinate along the optical surface measured from the top of the basic surface, and Y represents the coordinate perpendicular to the optical axis measured from the optical axis, and $\epsilon$ represents the aspheric coefficient.

In the first embodiment, the reflecting surface is applied to the object side surface ($r_3$) of the eyepiece lens component (Le), and a mark is provided on the eye side surface ($r_4$) thereof. In the second embodiment, aspheric surface is introduced to the eye side surface ($r_2$) of the objective lens component (Lo) for correcting the distortion well. In the third embodiment, both surfaces of the objective lens component (Lo) is aspheric for correcting the distortion.

In the fourth embodiment, a transparent plate (PL) is located at the eye side of the eyepiece lens component (Le), as shown in FIG. 8. The mark (M) is provided on the object side surface ($r_5$) thereof. The eye side surface ($r_2$) of the objective lens component (Lo) and the eye side surface ($r_4$) of the eyepiece lens component (Le) are aspheric. Since the transparent plate (PL) is constructed by a glass plate having two planes parallel to each other, the plate (PL) has almost no influence to the paraxial values and the aberrations, and protects the lens components (Lo)(Le) made of synthetic resin material. Furthermore, the mark (M) is provided on the plane, it becomes easy to provide the mark. In the fourth embodiment, as shown in FIG. 8, the objective lens component (Lo) has a step at its eye side portion, and the eyepiece lens component (Le) is fixed to the step. And the eyepiece lens component (Lo) has a step at its eye side portion, and the plate (PL) is fixed to the step. Therefore, the finder optical system can be integrated. Then, the deviation of lens components can be decreased.

Furthermore, in the present invention, an Albada finder optical system of inverted Galilean type has a relatively high magnification, while it has almost same size as the conventional inverted Galilean type finder optical system has.

TABLE 1

[Embodiment 1]

| | radius of curvature (mm) | axial distance (mm) | refractive index (nd) | Abbe number (νd) |
|---|---|---|---|---|
| Lo | $r_1 = -330$ | | | |
| | | $d_1 = 1$ | $n_1 = 1.4914$ | $\nu_1 = 57.9$ |
| | $r_2 = 19.564$ | | | |
| | | $d_2 = 4$ | | |
| Le | $r_3 = 69.922$ | | | |
| | | $d_3 = 24.5$ | $n_2 = 1.4914$ | $\nu_2 = 57.9$ |
| | $r_4 = -40$ | | | |

Finder magnification $\Gamma = 0.695$
Diopter of the object $= -1.000$
Diopter of the frame $= -1.098$
$d_2/d_3 = 0.163, d_3/L = 0.831$

TABLE 2

[Embodiment 2]

| | radius of curvature (mm) | axial distance (mm) | refractive index (nd) | Abbe number (νd) |
|---|---|---|---|---|
| Lo | $r_1 = -450$ | | | |
| | | $d_1 = 1$ | $n_1 = 1.4914$ | $\nu_1 = 57.9$ |
| | $r_2* = 9.406$ | | | |
| | | $d_2 = 4.5$ | | |
| Le | $r_3 = 192.24$ | | | |
| | | $d_3 = 26$ | $n_2 = 1.4914$ | $\nu_2 = 57.9$ |
| | $r_4 = -21.702$ | | | |

$r_2*$: Co = $1/r_2$, $\epsilon = 0.43$, Ci = 0
Finder magnification = 0.465
Diopter of the object = $-1.063$
Diopter of the frame = $-0.983$
$d_2/d_3 = 0.173$
$d_3/L = 0.825$

TABLE 3

[Embodiment 3]

| | radius of curvature (mm) | axial distance (mm) | refractive index (nd) | Abbe number (νd) |
|---|---|---|---|---|
| Lo | $r_1* = -60$ | | | |
| | | $d_1 = 1$ | $n_1 = 1.4914$ | $\nu_1 = 57.9$ |
| | $r_2* = 7.262$ | | | |
| | | $d_2 = 7$ | | |
| Le | $r_3 = 205.693$ | | | |
| | | $d_3 = 23.8$ | $n_2 = 1.4914$ | $\nu_2 = 57.9$ |
| | $r_4 = -19.013$ | | | |

$r_1*$: Co = $1/r_1$, $\epsilon = 1.0$, $C_2 = 1.25 \times 10^{-5}$, $C_3 = 1.0 \times 10^{-11}$
Ci(i ≠ 2.3) = 0
$r_2*$: Co = $1/r_2$, $\epsilon = 0.3$, Ci = 0
Finder magnification $\Gamma = 0.365$
Diopter of the object = $-1.040$
Diopter of the frame = $-0.993$
$d_2/d_3 = 0.294, d_3/L = 0.748$

TABLE 4

[Embodiment 4]

| | radius of curvature (mm) | axial distance (mm) | refractive index (nd) | Abbe number (νd) |
|---|---|---|---|---|
| Lo | $r_1 = -266.02$ | | | |
| | | $d_1 = 1$ | $n_1 = 1.4914$ | $\nu_1 = 57.9$ |
| | $r_2* = 20$ | | | |
| | | $d_2 = 4$ | | |
| Le | $r_3 = 75.198$ | | | |
| | | $d_3 = 24.5$ | $n_2 = 1.4914$ | $\nu_2 = 57.9$ |
| | $r_4* = -39.4$ | | | |
| | | $d_4 = 1.1$ | | |
| PL | $r_5 = \infty$ | | | |
| | | $d_5 = 1.2$ | $n_3 = 1.515$ | $\nu_3 = 51.45$ |
| | $r_6 = \infty$ | | | |

$r_2*$: Co = $1/r_2$, $\epsilon = 0.4$, Ci = 0
$r_4*$: Co = $1/r_4$, $\epsilon = -3.5$, Ci = 0
Finder magnification $\Gamma = 0.691$
Diopter of the object = $-1.016$
Diopter of the frame = $-1.005$
$d_2/d_3 = 0.163, d_3/L = 0.830$

What is claimed is:

1. An albada finder optical system of inverted Galilean type, comprising from the object side to the eye side;
  an objective lens component of a negative refractive power; and
  an eyepiece lens component of a positive refractive power having a reflecting surface at the object side;
  wherein the optical system fulfills the following conditions;

$0.35 < \Gamma < 0.8$ $0.1 < d_2/d_3 < 0.8$ $0.5 < d_3/L < 0.9$ wherein, $\Gamma$; the magnification of the finder optical system, $d_2$; the axial distance between the eye side surface of the objective lens component and the object side surface of the eyepiece lens component, $d_3$; the axial thickness of the eyepiece lens component, and L; the total length of the whole optical system.

2. An Albada finder optical system as claimed in claim 1, wherein the eyepiece lens component has a mark to be indicated in the finder field at its eye side surface.

3. An Albada finder optical system as claimed in claim 1, further comprising a mark plate having a mark to be indicated in the finder field, said mark plate being located at the eye side of the eyepiece lens component.

4. An Albada finder optical system as claimed in claim 1, wherein the optical system defines the following design parameters:

| | radius of curvature (mm) | axial distance (mm) | refractive index (nd) | Abbe number (νd) |
|---|---|---|---|---|
| Lo | $r_1 = -330$ | $d_1 = 1$ | $n_1 = 1.4914$ | $\nu_1 = 57.9$ |
| | $r_2 = 19.564$ | | | |
| | | $d_2 = 4$ | | |
| Le | $r_3 = 69.922$ | $d_3 = 24.5$ | $n_2 = 1.4914$ | $\nu_2 = 57.9$ |
| | $r_4 = -40$ | | | |

Finder magnifications $\Gamma = 0.695$
Diopter of the object $= -1.000$
Diopter of the frame $= -1.098$ 5. An Albada finder optical system as claimed in claim 1, wherein the objective lens component has at least an aspheric surface.

6. An Albada finder optical system as claimed in claim 5, wherein the objective lens component is made of synthetic resin material.

* * * * *